United States Patent [19]

Yamasaki

[11] 4,267,744

[45] May 19, 1981

[54] BICYCLE SPEED CHANGE LEVER

[75] Inventor: Kazuto Yamasaki, Osaka, Japan

[73] Assignee: Maeda Industries, Ltd., Osaka, Japan

[21] Appl. No.: 17,740

[22] Filed: Mar. 5, 1979

[30] Foreign Application Priority Data

Mar. 3, 1978 [JP] Japan ................................ 53/24844

[51] Int. Cl.³ .................... G05G 5/06; B62K 23/06
[52] U.S. Cl. ...................................... 74/475; 74/489;
74/527; 474/82
[58] Field of Search ................ 74/217 B, 475, 488,
74/489, 527; 474/82

[56] References Cited

U.S. PATENT DOCUMENTS

| 3,481,217 | 12/1969 | Maeda | 74/489 |
| 3,979,962 | 9/1976 | Kebsch | 74/475 X |
| 4,155,270 | 5/1979 | Juy | 74/475 |

*Primary Examiner*—Allan D. Herrmann

*Attorney, Agent, or Firm*—Birch, Stewart, Kolasch & Birch

[57] ABSTRACT

The present invention is directed to a bicycle speed change lever comprising a support shaft secured to a mounting member, a lever body pivotally mounted on the support shaft, and a click plate disposed adjacent the lever body so as to be slightly movable in opposite directions about the support shaft for presenting the alternative of two positional phases. A plurality of spaced circular holes are formed in the click plate and aligned in an arc of a circle, a steel ball is retained between a base portion of the lever body and the click plate so as to be disengageable with any one of the plurality of circular holes, and a phase converting mechanism for converting the positional phases of the click plate from one phase to the other and vice versa. The phase converting mechanism including an engaging member formed with the click plate and a switching member secured to the mounting member which cooperate to effect the phase converting only when the lever body is pivotally moved in a reverse direction.

10 Claims, 10 Drawing Figures

BICYCLE SPEED CHANGE LEVER

BACKGROUND AND SUMMARY OF THE INVENTION

The present invention relates to a bicycle speed control, and more particularly to improvements in a multi-step type of speed change lever which cooperates with a rear derailleur and a multi-speed free wheel assembly having a plurality of sprocket wheels of different diameter mounted on a rear axle of a bicycle, in order to switch over the running drive chain from one sprocket wheel to another for effecting the desired speed change.

It is well known to those skilled in the art that, in the speed change operation of a bicycle, it is desirable to make the drive chain intentionally over-shifted to such a position slightly beyond the position just under a sprocket wheel onto which the chain is to be switched over. By over-shifting the chain in this way, the chain is permitted to smoothly and quickly switched over onto a desired sprocket wheel without disengagement from the free wheel assembly.

Further, in case the drive chain is switched over from a smaller sprocket wheel onto a larger one, it is desirable to return the chain slightly back from the initial over-shifted position immediately, because the chain is likely to undersirably come into contact with a side wall of an adjacent larger sprocket wheel unless the chain is returned back immediately from the initial over-shifted position.

In the operation of a stepless type of bicycle speed change lever the above-discussed over-shifting and returning of the drive chain can be easily attained, although it is difficult to shift the chain quite accurately. On the other hand, the multi-step type of bicycle speed change lever is advantageous in accurate positioning of the drive chain, but it is very difficult to perform the above-discussed over-shifting and returning of the chain because of its particular construction in which the lever positions are fixed stepwise. Description on this point will now be made more in detail with reference to FIG. 9 of the accompanying drawings which diagrammatically illustrates the conventional chain shifting manners, in which reference numerals I, II, III, IV, V respectively designate positions just under each of the sprocket wheels of the five-speed free wheel assembly, and reference characters $P_a$, $P_b$, $P_c$, $P_d$, $P_e$, respectively designate predetermined chain stop positions over-shifted by a distance o. In case the lever is operated to shift the chain from a smaller sprocket wheel to a larger one, that is, in the direction of an arrow L in FIG. 9, the chain is desirably over-shifted by the distance o. However, in case the lever is operated in the reverse direction to shift the chain in the direction of an arrow S, the smooth and quick switching of the chain cannot be achieved, because the chain shift is naturally insufficient by the distance o. In othe words, the chain in this case is arranged to stop at one of the predetermined stop positions $P_a$, $P_b$, $P_c$, $P_d$, $P_e$ which lie short by the distance o of the positions I, II, III, IV, V, respectively, which are just under the sprocket wheels.

Further, even in case the lever is operated to shift the chain in the direction of the arrow L, the conventional bicycle speed change lever is not so designed as to permit a slight returning of the over-shifted chain toward the positions I, II, III, IV, or V, and, therefore, the over-shifted chain is inclined to undesirably come into contact with a side wall of a next larger sprocket wheel to the sprocket wheel onto which the chain is to be engaged, causing unpleasant noise and damage by abrasion with the chain and sprocket wheels.

Accordingly it is an object of the present invention to eliminate the above-discussed deficiencies in the conventional multi-step type bicycle speed change lever.

Another object of the invention is to provide an improved multi-step type bicycle speed change lever which permits a suitable distance of over-shifting of the bicycle drive chain not only in the case where the chain is switched over from a smaller sprocket wheel to a larger one but also in the reverse case, so that the bicycle speed change performance can be always carried out quickly and smoothly.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
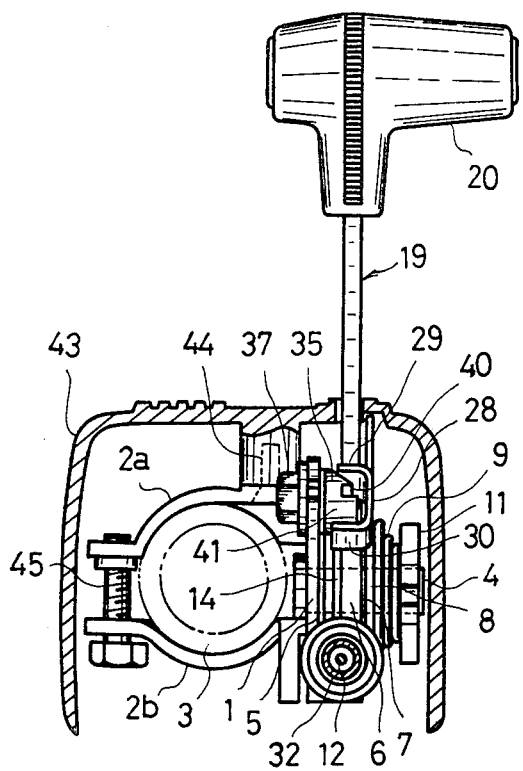
FIG. 1 is a front elevation, partly in section, of one embodiment of a bicycle speed change lever according to the present invention.

Referring now to the drawings, in particular to FIGS. 1 to 8, wherein identical reference numerals and characters are used throughout the various views to indicate identical elements, a bicycle speed change lever of the present invention comprises a mounting member 1 disposed substantially vertically, which is preferably formed with an integral horizontal extension 2a which cooperates with a fixing member 2b in order to fixedly secure the member 1 to a bicycle frame tube 3 by means of a clamping screw 45. The mounting member 1 has a lever support shaft 4 rigidly secured at one end thereto and extending horizontally therefrom. On the support shaft 4, there is mounted a first washer 5, a lever body 19, a second washer 7, a click plate 8, and a coil spring 9, all being formed with an axial hole through which said shaft 4 passes as is conventional. The shaft 4 may preferably be cut away at opposite sides so as to provide a pair of opposite flat surfaces and a pair of opposite round surfaces, as clearly shown in FIG. 3. The shaft 4 is formed with threads 10 at its free end, on which a nut 11 is engaged for tightening said washers 5, 7, a base portion 6 of the lever body 19, the click plate 8 and the coil spring 9.

Figure 2:
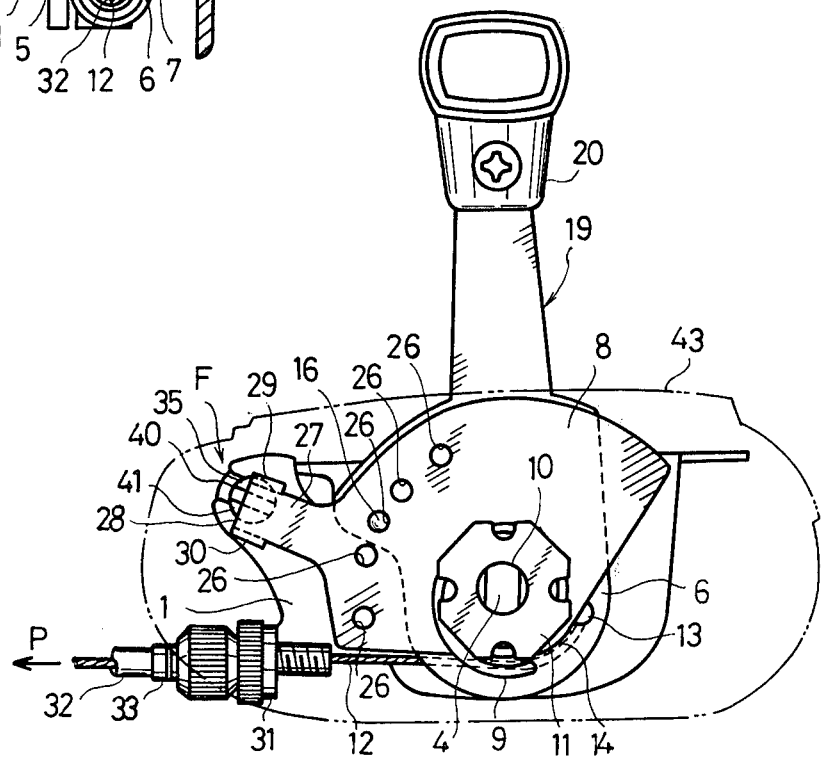
FIG. 2 is a right side elevation of the lever shown in FIG. 1, in which a housing is shown in a phantom line to more clearly illustrate the inside arrangements.

The lever base portion 6 is formed in position with a fixing hole 13 in which a terminal end of a known inner control wire 12 is fixed. A disk member 14 may preferably be mounted to the internal side wall of said base portion 6 so that the control wire 12 can be guided along the circumference of the disk member 14 as best shown in FIG. 2. In the external flat side wall 15 of the base portion 6 there is formed a semi-spherical concave 17 so that substantially half of a steel ball 16 can be retained therein for a purpose to be hereinafter described. The base portion 6 has an axial hole 18 formed therein, so that the lever body 19 can be pivotally supported on the shaft 4.

Figure 3:
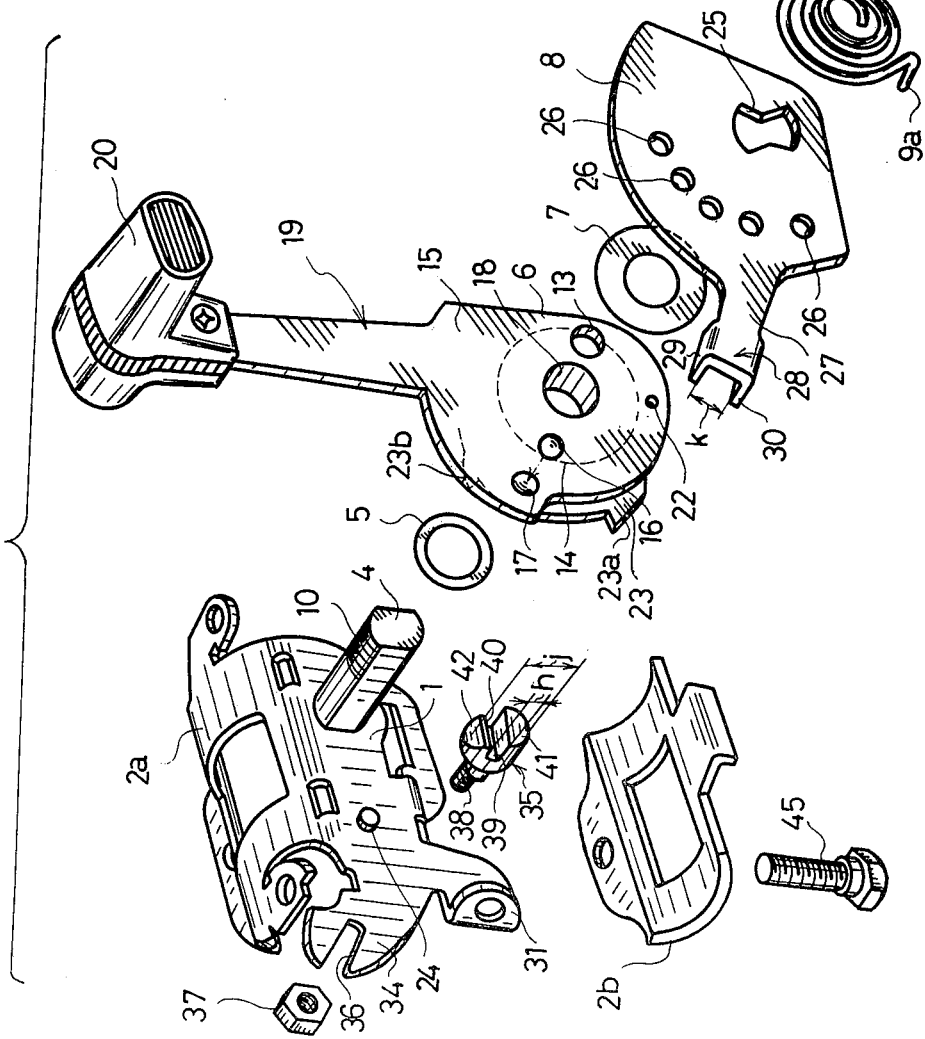
FIG. 3 is an exploded perspective illustration of the lever assembly shown in FIG. 1.
Figure 6A:
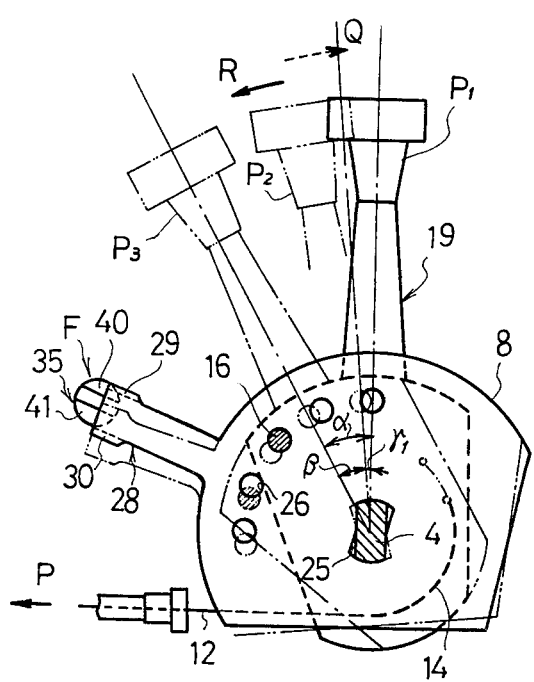
FIG. 6a is a schematic side elevation showing changeable lever positions corresponding to FIG. 5(1) (2) (3)
Figure 6B:
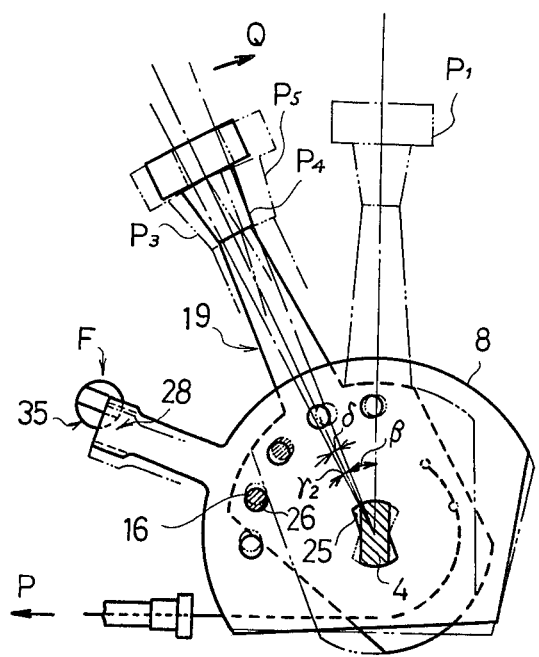
FIG. 6b is a similar view to FIG. 6a, showing changeable lever positions corresponding to FIG. 5(1) (3) (4) (5)

The lever body 19 is provided at its top with a handle grip 20 of a desired configuration. The base portion 6 may preferably be formed with an engaging hole 22, so that one free end 9a of the coil spring 9 can be received therein for fixing the spring 9 in position. On the internal side of said disk member 14 there is mounted a stopper plate 23 having a pair of spaced claws 23a, 23b which are engageable with a projecting stopper pin 24 secured to said mounting member 1, so that the angular movement of the lever body 19 is restricted within a predetermined range. This stopper mechanism herein described is a mere example and it may apparently be varied in many ways.

an axial hole 25 is formed in the click plate 8, through which the plate 8 is mounted on the support shaft 4. The hole 25 shold be formed so that the click plate 8 mounted on the shaft 4 can be slightly movable about the shaft 4 within certain limited angles for the purpose to be hereinafter described. For that purpose, the hole 25 may be, for instance, of such configuration that it is slightly enlarged toward its upper and lower ends while reduced at its intermediate portion as illustrated in FIGS. 3, 6a and 6b.

A plurality of ball receiving means preferably in the form of a plurality of circular holes 26, are formed in the click plate 8, in such a manner that they are spaced apart from each other by a certain predetermined distance and aligned in order from top to low gear positions in an arc of a circle, so that, when the lever handle is operated for speed change, said steel ball 16 retained in the semi-spherical concave 17 can be engageably and disengageably received in a selected one of the holes 26. Each of the holes 26 may preferably be tapered for easier engagement and disengagement with said ball 16. It will be easily understood that said holes 26 may be replaced by a plurality of substantially semi-spherical recesses (not shown). The number of the holes or said recesses may be predetermined in accordance with the number of available speeds. For instance, in case a bicycle to which the lever device is applied has a 5-speed system, the number of the holes or recesses should be at least five.

The click plate 8 is formed with an integral arm 27 which extends slantwise in the upward direction. At the top end of the arm 27 there is formed a substantially channel shaped engaging member 28 which includes an upper engaging piece 29 and a lower engaging piece 30. The pieces 29, 30 are spaced apart from each other by a predetermined distance k.

Said mounting member 1 is formed in position with a projecting ear 31 with a hole, to which one terminal end 33 of a known tubular form of outer control wire 32 is fixedly secured conventionally as best shown in FIG. 2. Said inner control wire 12 passes through the outer control wire 32.

The mounting member 1 further includes an extension 34 in which a fixing slot 36 is formed for fixing a switching member 35 with a thread shank 38 by means of a clamp nut 37. It is obvious that said slot 36 may be replaced by a fixing hole (not shown). The switching member 35 has an upper projection 40 and a lower projection 41 which are spaced apart from each other by a predetermined distance h (FIG. 3) which is large enough to receive said upper engaging piece 29 therebetween with sufficient clearance. The distance j (FIG. 3) between the outer extremities of the projections 40, 41 should be predetermined so as to be smaller than said distance k between said pair of engaging pieces 29, 30.

More particularly, the switching member 35 may, for instance, be made of a round bar metallic material by machining it to form said reduced threaded shank 38 as well as to form a diametrically extending slot 39 having a width h, thereby to provide said upper and lower projections 40, 41. Said upper projection 40 may preferably be cut so as to be half the length of the other projection 41. Further, the upper projection 40 should be cut away slantwise from top to bottom to form a tapered surface 42 which serves as a guide surface for the upper engaging piece 29. The switching member 35 should be fixed in position so that its slot 39 can be disposed substantially in parallel with said pair of engaging pieces 29, 30.

Figure 5:
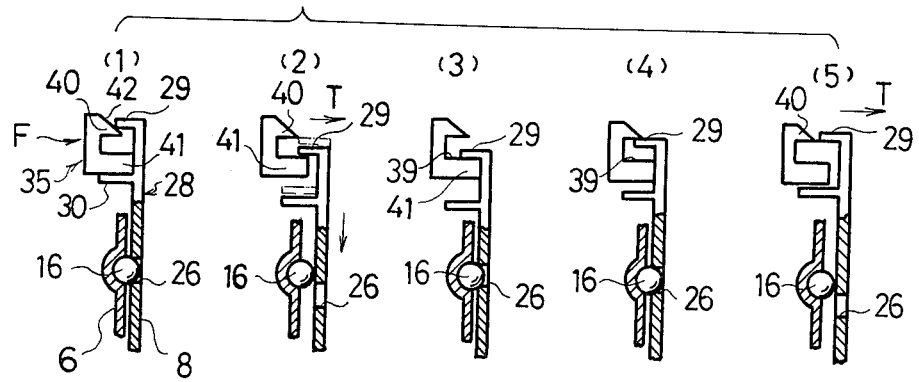
FIG. 5 is a series of diagrammatical illustrations showing changeable positions in operation of the essential elements of the invention.

The switching member 35 is arranged in opposed and engaged relation with respect to the engaging member 28, in such a manner that the upper engaging piece 29 is permitted to ride over the upper projection 40 into engagement with the slot 39, when the click plate 8 is moved downward about the shaft 4. Describing the arrangement in detail with reference to FIG. 5, when the steel ball 16 is in one of the plurality of circular holes 26 as shown in FIG. 5(1), the upper engaging piece 29 is in abutment with the tapered surface 42 of the upper projection 40, restricting the piece 29 from riding over the projection 40. However, when the ball 16 is out of the hole 26, the click plate 8 is forced to slightly move away from the lever base portion 6 by such a distance as corresponding to a ball portion that has been received in the hole 26, resulting in that the piece 29 can ride over the upper projection 40 into engagement with the slot 39 as shown in FIG. 5(2), or out of engagement with the slot 39 as shown in FIG. 5(5). It should be noted that the upper piece 29 is so arranged as to be prevented by the lower projection 41 from going down further, even when the ball is out of the hole 26, as shown in FIG. 5(2). On the other hand, the lower engaging piece 30 should be so arranged as to come into contact with the lower projection 40, when the upper engaging piece 29 is out of the slot 39 as shown in FIG. 5(1).

As a result, the click plate 8 is always in one of the two standard phases, one being the phase where the upper engaging piece 29 is in the slot 39, and the other being the phase where said piece 29 is out of the slot 39. These two phases can be, as described above, converted alternatively from one to the other under cooperative function of said engaging member 28 and the switching member 35. In other words, the members 28, 35 constitute a phase converting mechanism F which is characterized in that the one phase can be converted to the other, only when the lever body 19 is pivotally moved in the reverse direction. More particularly, as long as the lever body 19 is pivotally moved stepwise from one hole 26 to another in the same direction, the phase is not converted and, therefore, the click plate 8 stays in the same position. However, once the lever body 19 is moved in the reverse direction, the upper engaging piece 29 gets either into or out of the slot 39 to convert the phase, and at the same time the click plate 8 is slightly moved about the shaft 4 within a predetermined angular distance. In this connection, it will be easily understood that said phase converting mechanism F may be varied in several ways which are apparent to those skilled in the art, and thus, the scope of the present invention should not be limited to the specific constructions herein described and illustrated in detail.

In FIGS. 1 and 2, reference numeral 43 denotes a known housing, which may be mounted to the horizontal extension 2a of the mounting member 1 by means of a set screw 44.

Figure 4:
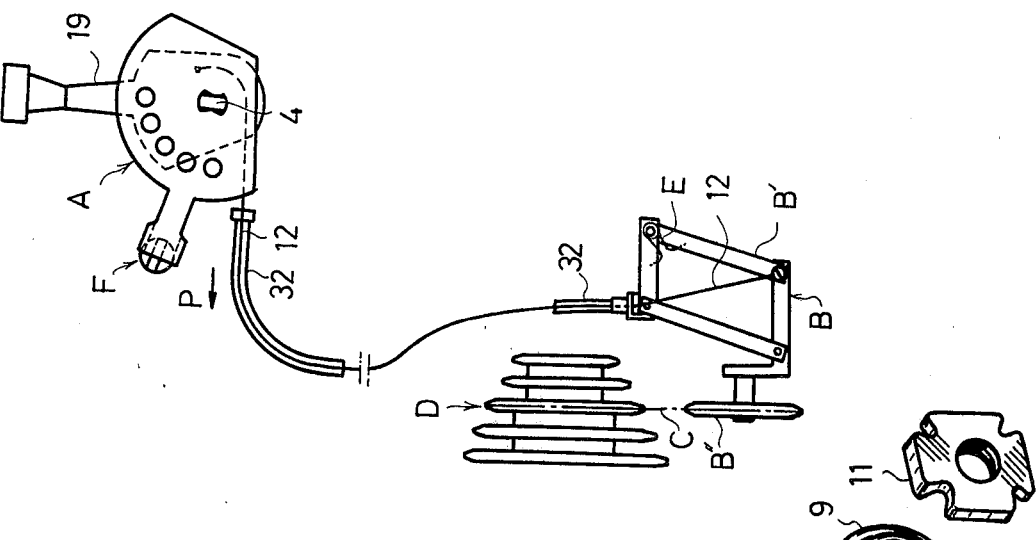
FIG. 4 is a schematic diagram showing the operational relation of the lever with a rear derailleur, a bicycle drive chain, and a multi-speed free wheel assembly.

In operation, as being apparent from FIG. 4, when the lever body 19 of the lever device A is pivotally moved by a certain turning angle, the inner control wire 12 is pulled by a certain distance corresponding to said turning angle to deform a known parallelogrammic element B' of the rear derailleur B to a certain degree so that a guide roller B'' is conventionally shifted for guiding the chain C to a selected gear position under function of a spring E, giving a tension P to the inner wire 12.

Figure 7:
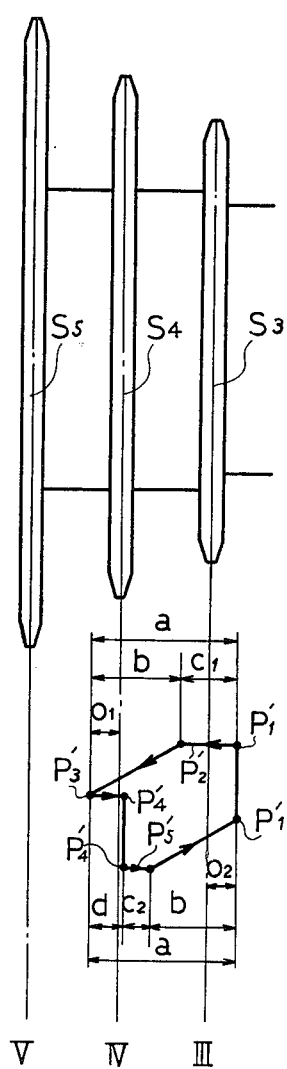
FIGS. 7 and 8 are schematic diagrams showing relations in operation of the chain shifting positions with each of the sprocket wheels of the multi-speed free wheel assembly.
Figure 8:
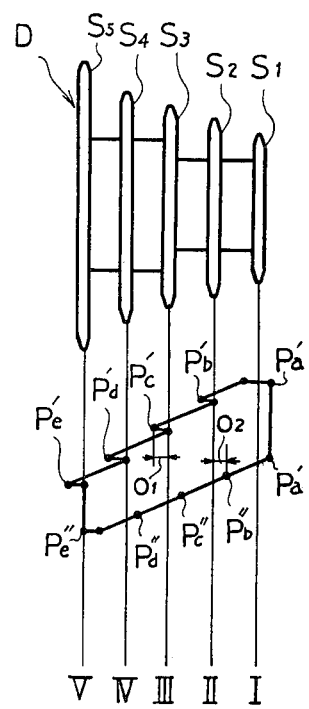

FIG. 5(1) shows a positional relation between the engaging member 28 and the switching member 35 at a stage where lever body 19 is in position $p_1$ in FIG. 6a. As the lever body 19 is shifted in the direction R from said position $P_1$ to position $P_2$ and then to position $P_3$, the positional relation between the members 28, 35 is changed as shown in FIG. 5(1) to FIG. 5(3). As the lever body 19 is shifted to position $P_2$, the ball 16 is forced out of the hole 26. As a result, the click plate 8 is forcibly pushed away in the direction T, so that the upper engaging piece 29 slides down along the tapered surface 42 of the upper projection 40 and finally rides over the projection 40 into engagement with the slot 39. In the case where the lever body 19 has been shifted from position $P_1$ to position $P_3$, the turning angle $\alpha$ of the lever body 19 with respect to the shaft 4 is substantially equal to the turning angle $\beta$ of the lever body 19 with respect to the click plate 8 plus the turning angle $\gamma_1$ of the click plate 8 with respect to the shaft 4. Consequently, as shown in FIG. 7, in the case where the drive chain is shifted over from position $P_1'$ to $P_3'$ ($P_1'$, $P_2'$, $P_3'$ show chain positions corresponding to the lever positions $P_1$, $P_2$, $P_3$, respectively) that is, from the smaller sprocket wheel $S_3$ to the adjacent larger sprocket wheel $S_4$, the chain shifting distance a is equal to a shifting distance b corresponding to said turning angle $\beta$ plus a shifting distance $c_1$ corresponding to said turning angle $\gamma_1$. Thus, a desired over-shifting distance $o_1$ is obtained.

FIG. 5(4) shows a positional relation between the members 28 and 35 at a stage where an operator has loosed his hold of the handle grip 20 immediately after the lever body 19 was shifted to the position $P_3$. As soon as the operator looses his hold of the handle grip 20, the lever body 19 is slightly returned in the direction Q by a certain turning angle $\delta$ until it takes the position $P_4$ corresponding to FIG. 5(4), because there is a certain clearance within the slot 39 and because the lever body 19 is under a tension force P of the inner wire 12 and thus pulled together with the click plate 8 in the direction of the arrow Q. As a result, as shown in FIG. 7, the chain is returned by a distance $\alpha$ from position $P_3'$ to position $P_4'$, that is, from the position which lies short by the distance $o_1$ of the position IV just under the sprocket wheel $S_4$ to such a position slightly beyond said position IV toward the smaller sprocket wheel $S_3$, thereby preventing the chain from undesirable contact with a side wall of an adjacent larger sprocket wheel $S_5$.

When the chain is shifted from the larger sprocket wheel $S_4$ to the adjacent smaller sprocket wheel $S_3$ by returning the lever body 19 from position $P_4$ to position $P_1$, the phase is again converted at the lever position $P_5$ as the upper engaging piece 29 comes out of the slot 39 as shown in FIG. 5(5). Thus, the click plate 8 is turned by a certain turning angle $\gamma_2$. Consequently, the chain shifting distance a is equal to the shifting distance b corresponding to the turning angle $\beta$ plus a shifting distance $c_2$ corresponding to the turning angle $\gamma_2$ of the click plate 8 with respect to the shaft 4, as shown in FIG. 7. In other words, the total chain shifting distance a includes a desired over-shifting distance $o_2$, resulting in that the smooth and quick chain shift can be achieved. Incidentally, there exits the following relation:

$$\gamma_1 = \delta + \gamma_2, \; c_1 = d + c_2$$

Figure 9:
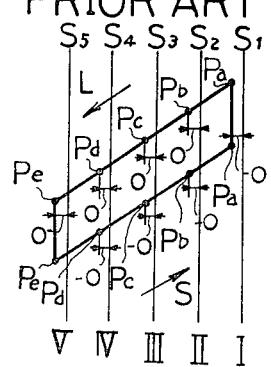
FIG. 9 is a similar view to FIGS. 7 and 8, showing the chain shifting positions by a conventional bicycle speed change lever.

The foregoing description has been made with reference to FIGS. 5, 6a, 6b and 7 which show the case where the drive chain is shifted from the third sprocket wheel $S_3$ to the fourth sprocket wheel $S_4$ and vise versa. Now further description is made for a better understanding of the advantageous features of the present invention with reference to FIG. 8 which shows the case where the chain is shifted from the smallest (first) sprocket wheel $S_1$ to the largest (fifth) sprocket wheel $S_5$ and vise versa, namely, from position $P_a'$ to positions $P_b'$, $P_c'$, $P_d'$, $P_e'$, $P_d'$, $P_c'$, $P_b'$, $P_a'$, in order. As will be clearly comprehensible by comparing FIG. 8 with FIG. 9 which shows the conventional chain shifting, the bicycle speed change lever mechanism according to the present invention can provide a desired over-shifting of the chain with respect to the positions I, II, III, IV, V which are positions just under the five sprocket wheels, respectively. This is possible not only when the chain is shifted from the smaller sprocket wheel to a larger one but also when the same is shifted from a larger one to a smaller one, facilitating the smooth, easy and quick chain shift. Referring in particular to the case where the chain is shifted from a smaller sprocket wheel to a larger one, it is possible to return the over-shifted chain slightly back by a certain distance by releasing the handle grip from the operator's hold, thereby to prevent the chain from undesirable contact with a side wall of an adjacent larger sprocket wheel.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A bicycle speed change lever comprising:
   a lever body pivotally mounted at its base portion on a support shaft,
   a click plate mounted on said support shaft and slightly spaced apart from said lever body, in such a manner that it is resiliently urged toward said base portion and is slightly movable about said support shaft in opposite directions for presenting alternative of two different positional phases,
   one of said two positional phases being that the click plate is in such a position as slightly turned upwardly,
   the other of said two positional phases being that the click plate is in such a position as slightly turned downwardly,
   at least one concave portion formed in said base portion for retaining a ball therein,
   a plurality of ball receiving means formed in said click plate,
   said plurality of ball receiving means being aligned in an arc of a circle in spaced-apart relation with each other,
   said ball being interposed between said base portion and said click plate so as to be engageable with and disengageable from a selected one of said plurality of ball receiving means, and
   a phase converting mechanism for converting said positional phases of the click plate from one to the other and vise versa only when directions of pivotal movement of said lever body is changed.

2. The speed change lever, as set forth in claim 1, wherein
   said ball receiving means is in the form of a plurality of circular holes formed in said click plate.

3. The speed change lever, as set forth in claim 1, wherein
   said ball receiving means is in the form of a plurality of recesses formed in said click plate.

4. The speed change lever, as set forth in claim 1, wherein
   said support shaft extends horizontally from a mounting member to be fixed to a bicycle frame tube.

5. The speed change lever, as set forth in claim 1, wherein
   said click plate is urged toward said base portion of the lever body by means of a coil spring mounted on said support shaft.

6. The speed change lever, as set forth in claim 1, wherein
   said click plate is formed with an axial hole through which said support shaft passes,
   said axial hole being of such configuration that it is slightly enlarged toward its upper and lower ends while reduced at its intermediate portion, so that the click plate can be slightly movable about said support shaft.

7. The speed change lever, as set forth in claim 1, wherein
   said phase converting mechanism includes an engaging member formed with said click plate and a switching member formed with a mounting member to be fixed to a bicycle frame tube,
   said engaging member having an upper engaging piece and a lower engaging piece,
   said upper and lower engaging pieces being spaced apart from each other by a predetermined distance,
   said switching member having an upper projection, a lower projection, and a slot formed between said upper and lower projections, and
   said switching member being arranged in opposed and engaged relation with respect to said engaging member, in such a manner that said upper engaging piece is permitted to ride over said upper projection into or out of engagement with said slot when side ball is disengaged out of any of said plurality of ball receiving means to forcibly push said click plate away from said base portion.

8. The speed change lever, as set forth in claim 7, wherein
   said upper projection is half the length of said lower projection.

9. The speed change lever, as set forth in claim 7, wherein
   said upper projection is formed with a tapered surface serving as a guide surface for guiding said upper engaging piece.

10. The speed change lever, as set forth in claim 7, wherein
    said switching member is formed with a reduced threaded shank,
    said switching member being rigidly secured to said mounting member by means of a clamp nut engageable with said threaded shank.

* * * * *